Nov. 7, 1961 W. GEISLER 3,007,585
PALLET LOADING MACHINES
Filed June 2, 1951 4 Sheets-Sheet 2
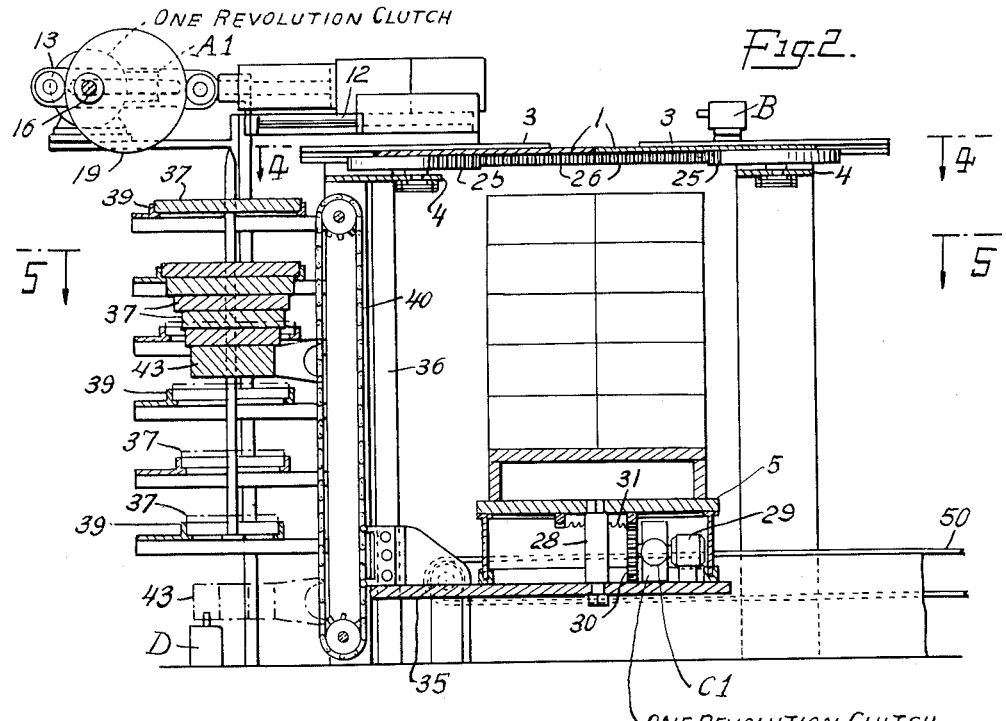
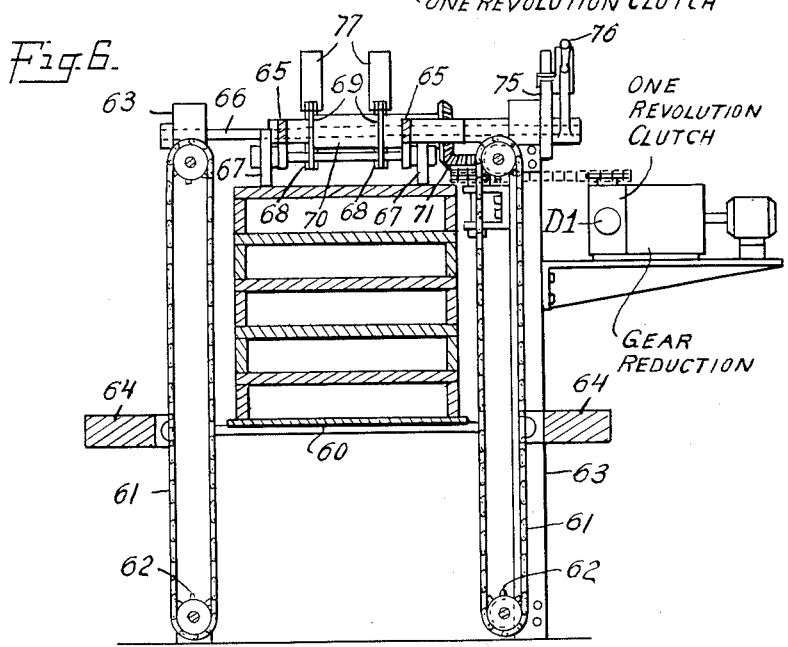
INVENTOR
WILLIAM GEISLER
BY
ATTORNEYS Nov. 7, 1961 W. GEISLER 3,007,585
PALLET LOADING MACHINES
Filed June 2, 1951 4 Sheets-Sheet 3
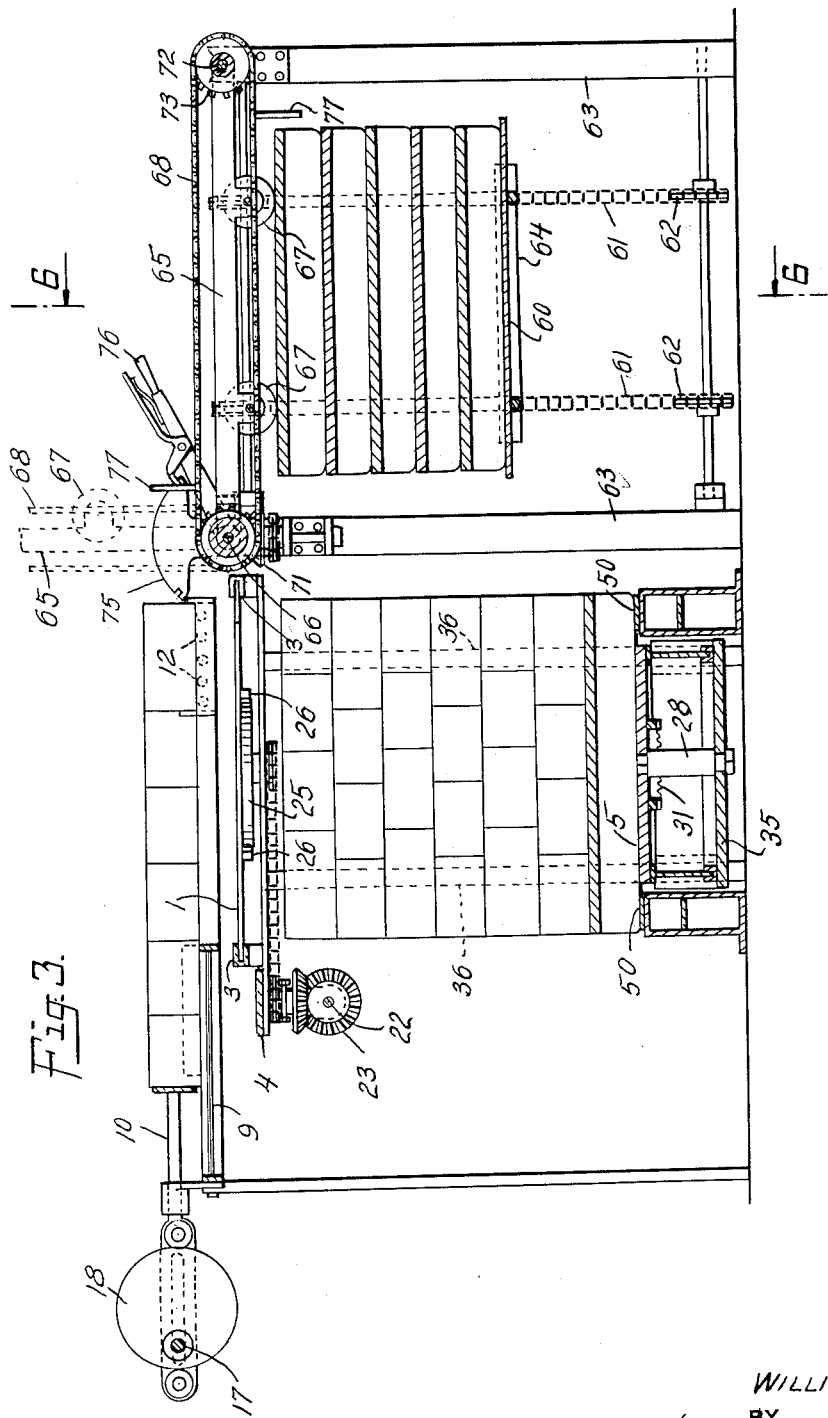
INVENTOR
WILLIAM GEISLER
BY
ATTORNEYS Nov. 7, 1961 W. GEISLER 3,007,585
PALLET LOADING MACHINES
Filed June 2, 1951 4 Sheets-Sheet 4
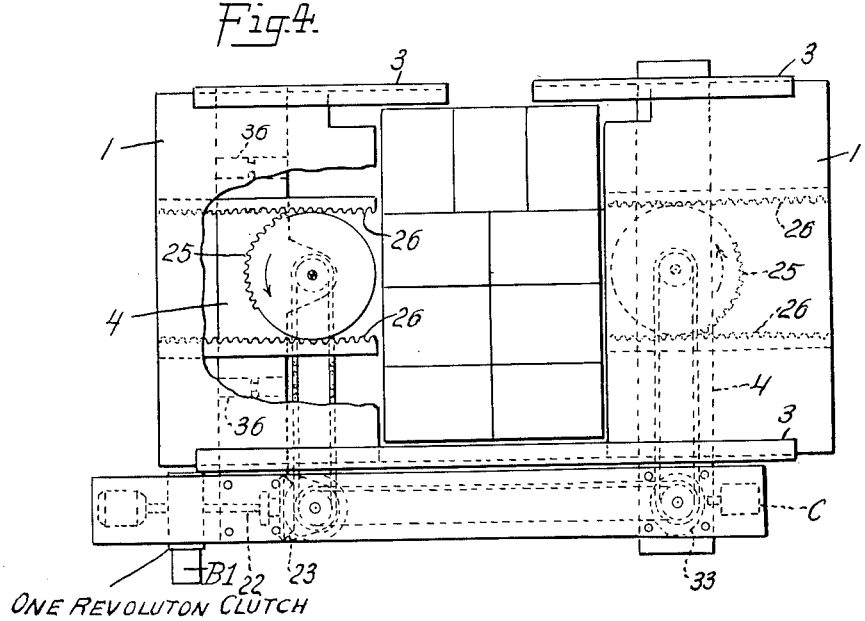
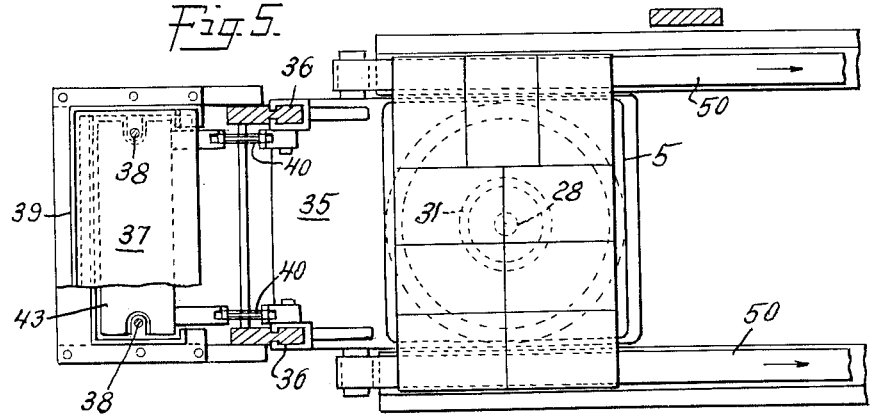
INVENTOR
WILLIAM GEISLER
BY
ATTORNEYS

# United States Patent Office 3,007,585
Patented Nov. 7, 1961

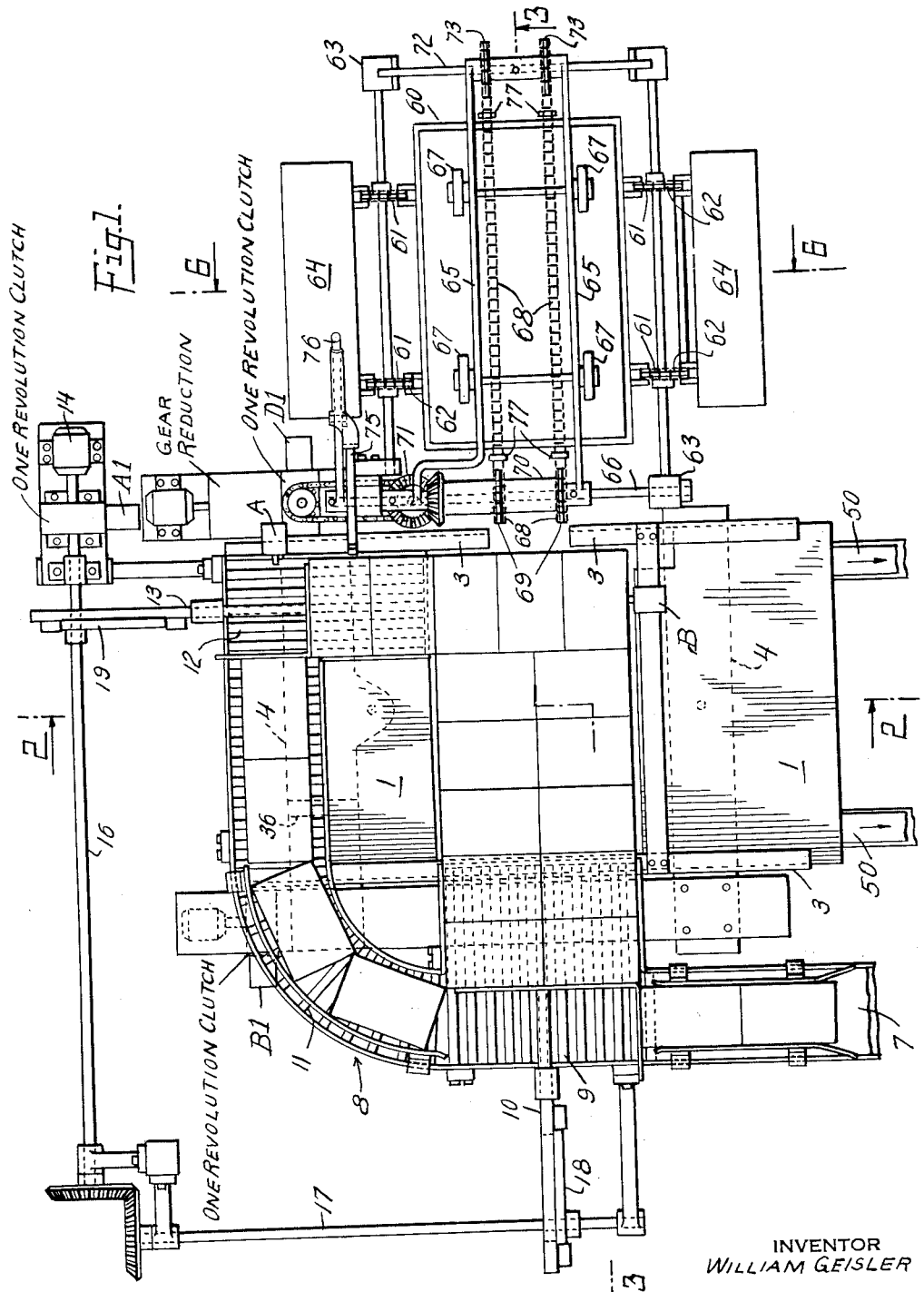

3,007,585
PALLET LOADING MACHINES
William Geisler, Tenafly, N.J., assignor, by mesne assignments, to Wilbro Corporation, Hackensack, N.J., a corporation of New Jersey
Filed June 2, 1951, Ser. No. 229,622
14 Claims. (Cl. 214—6)

This invention relates to machines for loading pallets and has for its object to provide a completely automatic machine for loading pallets with cartons, shipping cases and the like from one or more conveyor lines and delivering the loaded pallets to a delivery conveyor from which they may be removed by lift trucks or otherwise.

A further object of the invention is to provide a machine of the class described which will modify the arrangements of the cartons or shipping cases in each successive layer loaded on the pallet to thereby interlock the load in such manner that it will not fall apart upon tilting, sudden stoppage or other incident which may occur in the normal handling of loaded pallets in the transfer of merchandise.

A further object of the invention is to provide a machine which will continue in operation without attention so long as the machine is supplied with pallets and cases to be loaded thereon; which will automatically stop when the supply of cases or pallets is exhausted and will start again without attention when the supply of pallets and cases is restored.

A further object of the invention is to provide a machine which embodies throughout simple mechanical devices such as one-revolution clutches and the like, and requires no separate and involved control system to carry out the necessary sequence of operations.

In the accompanying drawings I have illustrated a preferred embodiment of my improved pallet-loading machine, and in the said drawings, FIG. 1 is a plan view of the entire machine showing a portion of the conveyors by which the cases are delivered to the machine and the loaded pallets removed from the machine;

FIG. 2 is a vertical sectional view on line 2—2 of FIG. 1;

FIG. 3 is a vertical sectional view on line 3—3 of FIG. 1;

FIG. 4 is a horizontal sectional view on line 4—4 of FIG. 2;

FIG. 5 is a horizontal sectional view on line 5—5 of FIG. 2; and

FIG. 6 is a vertical sectional view on line 6—6 of FIG. 3.

Referring to the drawings, particularly to FIG. 1, the machine comprises a load-receiving table consisting of two plates 1 supported for sliding movement toward and away from each other in stationary tracks 3 mounted on the frame 4 of the machine at an elevation slightly above the top surface of the uppermost layer of cases when the pallet is fully loaded and the pallet-supporting platform 5 is in its lowermost position, as indicated in FIG. 3. In FIG. 1 the sections 1 of the load-supporting platform are shown as pulled apart to permit the load previously assembled on the plates to be deposited on the pallet supported on the platform 5 or upon the previously deposited layer of cases on the pallet. It will be understood that during the assembly of the cases on the plates the two plates are brought together as shown in FIG. 2, constituting in effect a single continuous plate of an area and shape sufficient to support the layer of assembled packages.

As shown in FIG. 1, the cases to be assembled are brought to the pallet-loading machine by means of a belt conveyor 7 which delivers the cases to a roller bed 8 which extends around one end and one side of the load-receiving platform. The roller bed 8 consists of a section 9 of parallel rollers whose axes are parallel with the pulleys supporting the conveyor belt 7, the rollers 9 being, however, of greater length than the width of the conveyor 7 and so arranged with respect to the conveyor 7 that the cases brought to the machine by the conveyor 7 are delivered to the rollers 9 adjacent the ends of the rollers remote from the platform 1. The rollers 9 extend from the far edge of the conveyor 7 to a point adjacent the platform 1 and somewhat above the platform, as illustrated in FIG. 3, whereby the rollers serve to receive the cases from the conveyor belt and also as a support for the cases when they are shifted from the path of the conveyor by the loading plunger 10 which will be later described.

Beyond the rollers 9 the roller bed 8 comprises a series of rollers 11 arranged in an arcuate path for guiding the cases to a second series of parallel rollers 12 whose axes are at right angles to the rollers 9 and which, like the rollers 9, extend to a point adjacent to and slightly above the platform 1. A second loading plunger 13 moving at right angles to the plunger 10 is provided for shifting the cases delivered to the rollers 12 from the rollers onto the loading platform 1.

The loading plungers 10 and 13 are operated in synchronism by any suitable mechanism. I have illustrated for the purpose an electric motor 14 which through a suitable gear reduction, not shown, operates the driving member of a one-revolution clutch, also not shown, but indicated at A1, the driven member of which is attached to a shaft 16 which extends parallel with the side of the load-receiving platform 1. The shaft 16 is geared to a similar shaft 17 at right angles thereto, so that the two shafts will, at each operation of the one-revolution clutch, be given one complete revolution.

Attached to the shaft 17 is an eccentric 18 which operates the plunger 10 at each revolution of the shaft 17 through a distance corresponding to the width of the packages to be loaded. The plunger 10 as shown in FIG. 1 consists of a plate or head which engages two sections at right angles to each other, whereby the plunger as it moves toward the load-receiving platform 1 will shift the three cases in front of the plunger along the rollers 9 in a direction toward the loading platform and will at the same time hold back the cases advanced by the conveyor 7 until the plunger on its return stroke clears the distant edge of the cases to thereby permit the row of cases to again advance along the roller beds.

In like manner the plunger 13 is provided with a driving eccentric 19 which operates the plunger through one complete stroke at each operation of the one-way clutch to shift the end-most case on the rollers 12 toward the loading platform.

The one-revolution clutch A1 is controlled by means of a movable contact A (see FIG. 1) which closes a circuit through the solenoid controlling the one-revolution clutch to thereby cause the two plungers 10 and 13 to make a complete stroke, thereby shifting the cases in front of the plungers a distance along their respective rollers equal to the width of the cases. After the one revolution of the shaft is completed the plungers remain idle until the cases advance along the roller bed a sufficient distance to again create a complete line of cases from the contact A back to the conveyor belt 7. As soon as the row of cases is again complete the contact A is closed and the operation of the plungers repeated to thereby advance a second series of cases from the line across the rollers on which they are supported, such movement shifting the previously shifted group of cases a distance equal to the width of the cases.

In the arrangement shown the cases are rectangular in shape with the short dimension of the case equal to two-thirds the length of the case. For example, the cases may be 12 x 18 inches in area. The cases are arranged on the pallets as shown in FIGS. 4 and 5 with nine cases to a layer, three cases being arranged across one end of the pallet with their sides parallel with the side of the pallet, while six cases are arranged in two rows of three cases each with the sides of the cases arranged parallel with the ends of the pallet.

To assemble this load on the load-receiving platform 1, the plungers operate three times, the plunger 13 at each operation shifting one case from the end of the line, while the plunger 10 is of a width to shift two cases from the line adjacent the conveyor 7.

It will be understood that in starting the machine the path from the conveyor 7 to the contact A will be filled with a row of cases and also there will be two cases between the plunger 13 and the loading platform 1 and four cases on the rollers 9 alongside the cases in the row, such cases having been left from the previous operation of the machine. Hence when the machine is started up, the case which closes the circuit through the contact A will be shifted along the rollers 12 a distance equal to the stroke of the plunger and will at the same time push the outermost of the two cases left on the rollers 12 onto the load-receiving platform 1. In like manner the plunger 10 will push the two outermost cases left on the rollers 9 onto the load-receiving platform. At each successive operation of the plungers three additional cases will be transferred to the loading platform, such cases in their movement pushing ahead of them the previously delivered cases until the assembled load of nine cases is positioned on the platform in the arrangement illustrated in FIGS. 4 and 5.

A contact switch B similar to the contact A is supported above the plane of the loading platform 1 in position to be closed by the case at the corner of the assembled load as it is moved into position upon the third stroke of the plunger 13. The contact B energizes a one-rev. clutch B1 similar to the previously described one-rev. clutch to thereby impart a single revolution to the driven shaft 22 of the one-rev. clutch. This shaft carries on its end a beveled gear 23 which through suitable gearing and chains as illustrated in FIG. 4 operates two mutilated gears 25 supported on vertical shafts carried by frame members underlying the tracks 3, as shown more particularly in FIGS. 3 and 4. The gears 25 mesh with racks 26 fastened to the under side of the platform members 1 whereby on one complete revolution of the gears 25 the plates 1 will be shifted apart on their tracks 3 to allow the load carried by the plates to drop onto the previous layer of articles supported by the pallet and then, after a brief interval sufficient for the load to drop below the under side of the plates, will be shifted toward each other to again present a continuous surface for receiving the next layer of cases. When the plates are brought together in closed position the one-revolution clutch disengages itself and the platform 1 is again ready to receive the cases.

After the first layer of cases is delivered to the platen supported on the platform 5 the platform is rotated through a half revolution so that the three cases forming the single row at the end of the pallet as shown in FIG. 4 will be brought around to a position corresponding with the other end of the pallet so that each successive layer deposited on the platen will be differently arranged from the preceding layer and thus interlock the cases against falling apart as will occur when the cases are stacked in the same arrangement for each layer. To accomplish this partial revolution of the pallet the platform 5 is made in two sections, the upper section being mounted upon a vertical shaft 28 at its center so that the upper section may be rotated with respect to the lower section. For rotating the upper section on the platform 5 I preferably provide an electric motor 29 which through a suitable reduction gear and one-rev. clutch C1 drives a gear 30 which as shown in FIG. 2 is in mesh with a crown gear 31 attached to the under side of the upper portion of the platform 5.

In order to release the one-rev. clutch which controls the operation of the turntable a contact C is provided which is closed by a cam 33 (see FIG. 4) which is rotated through the one-rev. clutch B1 by which the mechanism for opening and closing the two sections of the load-receiving platform 1 is driven. The cam 33 is so positioned with respect to the contact C that the contact is closed as the two sections of the platform 1 approach their closed position. By this time the load of cases deposited on the stack carried by the pallet will have dropped out of the plane of the platform 1 and the space surrounding the stack of cases will be clear so that the pallet may be rotated through 180 degrees to thereby obtain the necessary interlocking of the cases making up the load.

The platform 5 is carried by a cross head 35 which is guided for vertical movement by the two vertical frame members 36 underlying the rollers 12 of the roller bed 8, as shown particularly in FIGS. 2 and 5. The platform 5 is not moved positively up and down but is so counterweighted that it will with each layer of cases deposited on the pallet descend a distance equal to the height of the cases and remain in such position until the next layer is added. To this end there is provided a series of counterweights 37 supported for vertical movement on vertical guide rods 38 adjacent the frame members 36. The weights are, as shown in FIG. 2, of different dimensions, and supported in vertically spaced relation around the guide rods 38 are a series of frames 39 having passages therethrough which are also of different dimensions, the arrangement being such that the lowermost of the several counterweights will pass through all the frames 39 except the bottom frame, while the second counterweight from the bottom of the series will pass through all the frames except the second from the bottom, and so on, until the top frame, which will allow all the weights to pass save the topmost weight. The counterbalance weights co-operate with the platform 5 through the medium of two sprocket chains 40 arranged between the frame members 36, the sprocket chains being attached at one point to the cross head 35 which carries the platform 5. Connected to the opposite reach of the sprocket chains is a heavy plate 43 of a size to pass through the openings in all the frames 39 so that as the platform 5 moves downwardly under the weight of the load assembled on the pallet the plate 43 will be moved upwardly along the rods 38 to successively pick up the several counterweights resting on the respective frames. The plate 43 is of a weight to somewhat overbalance the platform 5 with an empty pallet thereon and each of the weights 37, although of different areas, is of a weight substantially equal to one layer of cases. Hence when the first layer of cases is placed on the pallet the plate 43 will be overbalanced and the platform 5 will descend, elevating the plate 43 until it engages the weights 37 on the bottommost rack 39. The weight of the platform with one layer of packages is insufficient to lift this first weight so that the platform 5 is stopped at a position such that the top surface of the layer of cases deposited on the pallet is at the same height as the upper surface of the pallet before it received the first layer. When the second layer of cases is deposited on the pallet the added weight is sufficient to lift the first of the series of counterweights 37 so that the platform 5 descends until the top surface of the first weight 37 contacts the under surface of the second weight 37, which thereupon stops the descent of the platform 5 in position to receive the second layer of cartons. This operation automatically repeats itself with each layer added to the pallet until the pallet is loaded and the platform 5 reaches its lowermost position.

In order to remove the loaded pallets from the platform 5 there are provided a pair of conveyor belts 50

(see FIG. 5) which are disposed alongside the ends of the platform 5 when in its lowermost position, as shown more particularly in FIGS. 2 and 5. The platform 5 is substantially square whereas the pallets are of rectangular configuration and are positioned on the platform to project at each end beyond the side edges of the platform 5. The upper reach of each of the conveyer belts is supported at a level slightly above the upper face of the platform 5 in its lowermost position, hence, as the platform descends under the weight of the load the projecting ends of the bottom pallet will engage the upper faces of the conveyor belt and the belts will remove the loaded pallet from the platform 5. When the loaded pallet is removed from the platform 5 the stacked counterweights will overbalance the empty platform and the weights will descend through the spaced frames 39, each weight being caught by its respective frame until all the weights are supported in spaced relation to the frame and the platform 5 is again at its uppermost position.

At this point it is necessary to feed an empty pallet to the platform 5 in order that the loading of the pallets may continue without interruption. The pallet-supplying means is shown in FIGS. 1, 3 and 6, and comprises a pallet-supporting platform 60 carried by four sprocket chains 61 working on sprocket wheels 62 mounted on idle shafts adjacent the top and bottom of the vertical frame members 63 which are spaced apart sufficiently to allow a free vertical movement of a stack of pallets placed on the platform 60. The outer reach of both parts of sprocket chains 61 carries a counterweight 64, the two counterweights being sufficient to overbalance a full load of pallets placed on the platform 60, so that the weights serve to lift the load of pallets and maintain the topmost pallet at the desired level for transfer to the platform 5.

To retain the topmost pallet at the desired level and also to feed the pallets from the platform 60 to the platform 5, there is provided a pair of lever arms 65 attached to a rock shaft 66 supported in bearings at the upper ends of the vertical frame members adjacent the platform 5. The arms 65 are connected by cross rods on the ends of which are mounted rollers 67 against which the uppermost pallet is pressed by the counterweights 64, when the levers 65 are locked in horizontal positions. Also carried by the arms 65 are two sprocket chains 68 driven by sprocket wheels 69 attached to a sleeve 70 carried by the rock shaft 66. The sleeve 70 is driven by a bevel gear 71 through a suitable gear train from a one-revolution clutch D1 supported on a bracket attached to the adjacent frame member. The outer ends of the lever arms are connected by a cross shaft 72 on which are mounted the sprocket wheels 73 for the sprocket chains 68. The two arms 65 and the shafts 66 and 72 form a rectangular frame which may be swung about the shaft 66 from the horizontal position as illustrated in full lines in FIG. 3 to the vertical position illustrated in dotted lines. A notched sector 75 and an operating lever 76 are provided for turning the shaft from horizontal to vertical position and vice versa and locking it in either of its two positions. Attached to each of the sprocket chains 68 are two outwardly projecting feed bars 77 positioned to engage the edge of the uppermost pallet and shift the pallet as the lower reaches of the sprocket chains move toward the platform 5 from the platform 60.

The one-revolution clutch which drives the sprocket wheels 69 is controlled by a contact D mounted on the floor in a position underlying the frame 43 by means of which the counterweights for the platform 5 are controlled. When the platform 5 reaches its uppermost position the frame 43 will reach its lowermost position, as indicated in dotted lines in FIG. 2 and will close the contact of the switch D, releasing the one-revolution clutch D1 and thereby driving the sprocket chains 68 to shift the topmost pallet from the platform 60 to the platform 5 where it will be in position to receive the first layer of cases which, during the operations of removing the loaded pallet and feeding the empty pallet to the platform 5, is being assembled on the load-receiving platform 1.

The empty pallets may be assembled on the platform 60 in any approved manner. The usual practice is to assemble the desired number of platforms on an ordinary lift truck such as used for handling the pallets. The stack of pallets is elevated by the lift truck until the runners of the bottom pallet are at an elevation slightly above the upper surface of the platform 60 when in the uppermost position to which it is raised by the counterweights 64 when the latter reach their lowermost positions. The operator with the stack of pallets turns the lever 76 from the position shown in full lines in FIG. 3 to the position indicated in dotted lines, thereby raising the frame carrying the sprocket chains 68 to vertical position so that the stack of pallets may be deposited on the platform 60. With the forks of the lift truck carrying the stack of pallets properly positioned over the platform 60 the operator of the lift truck lowers the stack of pallets, thereby also lowering the platform 60 until the upper surface of the topmost pallet is below the plane of the bottom face of the rollers 67 when the latter are in the horizontal full-line position shown in FIG. 3. With the platform still held down by the lift truck the operator returns the frame 65 to its horizontal position and then withdraws the lift truck fork so that the counterweights will lift the stack of pallets against the rollers 67 in position for the uppermost pallet to be fed to the platform 5 by the sprocket chains 68 when the loaded pallet is removed therefrom and the platform returns to its uppermost position.

The machine illustrated in the accompanying drawings and described above represents the preferred embodiment of my invention in the simplest form for completely automatic operation. It will be understood, however, that the machine may be variously modified to meet the different conditions which exist in the handling of different kinds of merchandise. For example, it is sometimes desirable to supply the pallets from two different feed lines in which case the two lines can be arranged at right angles to each other and the two plungers controlled by two contacts arranged in series so that the cases will not be fed to the loading platform unless both lines are full. Also sometimes, particularly with heavy cases, it is desirable to hold back the feed line while the cases are being shifted to the load-receiving platform. There are a number of case timers on the market which may be readily adapted for the purpose. Also it may be desirable to positively advance the cases from the feed conveyor to their positions in front of the feed plungers by "live" rollers or other suitable means, and if desired, safety switches may be provided to prevent the operation of one part of the machine until the preceding operation in the cycle is completed.

In the foregoing specification I have described the machine as adapted for positioning a load consisting of 54 cases on a pallet in six layers of nine cases to each layer, the cases being arranged in two rows of three cases each at one end of the pallet and one transverse row of three cases at the other end of the pallet. Such an arrangement is suitable for cases whose transverse dimensions bear a ratio of 2 to 3. This is a common size of case used for canned goods, bottles and the like which are arranged in the case in layers made up of four rows of six cans or bottles.

For cases of other relative dimensions a different arrangement of cases on the pallet is desirable. For example, cases whose horizontal dimensions have a ratio of 3 to 4, which is a customary type of case for cans or other articles arranged in layers of three rows of four cans each, may be arranged on the pallet in layers consisting of three rows of four cases each at one end of the case and one transverse row of three cases at the other end of the pallet. Such an arrangement could be loaded by the above-described machine without change other than to change the dimensions and strokes of the plungers to correspond with the dimensions of the cases to be packed. Such a load would also require that the cases be placed on the feed conveyor 7 with their long dimensions perpendicular to the line of feed.

Change in the stroke and dimensions of the plunger may obviously be made in various ways. For example, the operating eccentrics 19 may be removed and an eccentric of different dimensions substituted. Also, of course, the plunger face may be made of relatively adjustable parts or a new plunger head substituted.

Various other arrangements of the cases in the layers may be made by changing the strokes and dimensions of the plungers and also by changing the gear ratio between the plungers. To change the number of layers to be assembled on the pallet, it is only necessary to vary the positions of the frames 39 which support the counterweights and also, of course, use counterweights of the proper weight for the particular goods being packaged. While no means for adjusting the various parts have been illustrated in the accompanying drawings, it will be understood that the invention is deemed to include machines having relatively adjustable parts except insofar as such constructions are excluded by the appended claims. Various other engineering refinements may also be made without departing from the spirit of the invention or the scope of the appended claims.

I claim:

1. In a pallet-loading machine, means for supporting the pallet to be loaded, a support for articles to be loaded on the pallet at one side and above the upper face of the pallet-supporting means, a second support for articles to be loaded on the pallet adjacent an edge of the pallet at right angles to the first-mentioned support, and means for shifting the articles from said supports to positions overlying different portions of said pallet to thereby form layers of articles on said pallet, each layer composed of articles from both supports.

2. In a pallet-loading machine, means for supporting the pallet to be loaded, a support for articles to be loaded on the pallet at one side and above the upper face of the pallet-supporting means, a second support for articles to be loaded on the pallet adjacent an edge of the pallet at right angles to the first-mentioned support, and means for feeding articles to said supports and arranging the articles on one support in different positions as regards their own dimensions from the articles on the other support, and means for shifting the articles from said supports to positions overlying different portions of said pallet to thereby form layers of articles on said pallet, each layer composed of articles from both supports.

3. In a pallet-loading machine, a vertically movable support for the pallet to be loaded, a support for articles to be loaded on the pallet at one side and above the upper face of the pallet-supporting means, a second support for articles to be loaded on the pallet adjacent an edge of the pallet at right angles to the first-mentioned support, means for successively shifting articles from said supports to positions overlying different portions of said pallet to thereby form layers of articles on said pallet, each layer composed of articles from both supports, and means for successively positioning said pallet at lower levels as successive layers are delivered thereto to properly position the upper surface of the top layer to receive a succeeding layer.

4. In a pallet-loading machine, a vertically movable support for the pallet to be loaded, a support for articles to be loaded on the pallet at one side and above the upper face of the pallet-supporting means, a second support for articles to be loaded on the pallet adjacent an edge of the pallet at right angles to the first-mentioned support, means for successively shifting articles from said supports to positions overlying different portions of said pallet to thereby form layers of articles on said pallet, each layer composed of articles from both supports, means for successively positioning said pallet at lower levels as successive layers are delivered thereto to properly position the upper surface of the top layer to receive a succeeding layer, and means for partially rotating said pallet after each layer is deposited thereon to effect an interlocking of the articles on the pallet.

5. In a pallet-loading machine, a vertically movable support for the pallet to be loaded, a support for articles to be loaded on the pallet at one side and above the upper face of the pallet-supporting means, a second support for articles to be loaded on the pallet adjacent an edge of the pallet at right angles to the first-mentioned support, means for feeding articles along one support, thence along the second support while maintaining the same face of the article perpendicular to the direction of feed, means for successively shifting articles from said supports onto said pallet to form layers of articles on said pallet, means for successively positioning said pallet at lower levels as successive layers are delivered thereto to properly position the upper surface of the top layer to receive a succeeding layer, and means for partially rotating said pallet after each layer is deposited thereon to effect an interlocking of the articles on the pallet.

6. In a pallet-loading machine a vertically movable counterbalanced support for the pallet to be loaded, means for depositing articles in successive layers on a pallet on said support and means for successively adding to the counterbalancing force in increments approximately equal to the weight of the layers successively added to said pallet after said support is moved a distance equal to the height of the last deposited layer of articles.

7. In a pallet-loading machine a vertically movable support for the pallet to be loaded, a counterbalance for maintaining the support and empty pallet in an elevated position, means for depositing articles in successive layers on a pallet on said support, means for successively adding to the counterbalancing force in increments approximately equal to the weight of the layers successively added to said pallet after said support is moved a distance equal to the height of the last deposited layer of articles, means for removing the loaded pallet from said support when it reaches its lowermost position and means for successively reducing the counterbalancing force as the pallet support moves upwardly.

8. In a pallet-loading machine a vertically movable and rotatable support for the pallet to be loaded, means for depositing articles in successive layers on a pallet on said support, means for partially rotating said support after each layer is deposited thereon, means for successively positioning said pallet support at lower levels as said layers are deposited thereon and for returning said support to the uppermost position when the loaded pallet is removed therefrom and means controlled by said pallet support upon its upward movement for placing an empty pallet on said support after the removal of the loaded pallet therefrom.

9. In a pallet-loading machine a vertically movable support for the pallet to be loaded, means for assembling articles in layers, means for depositing such layers successively on a pallet on said support, means for successively positioning said pallet support at lower levels as said layers are deposited thereon and for returning said support to its uppermost position when the loaded pallet is removed therefrom and means controlled by said pallet support upon its upward movement for placing an empty pallet on said support after the removal of the loaded pallet therefrom, said means comprising a pallet-feeding means having a control member positioned to be engaged by said pallet-supporting means when the pallet-supporting member thereon reaches its uppermost position.

10. In a pallet-loading machine a rotatable support for the pallet to be loaded, article-receiving means overlying said pallet support, means for feeding articles to positions alongside said article-receiving means, means controlled by the articles in movement as they are fed into positions adjacent said article-receiving means for shifting said articles from such positions onto said article-receiving means, means actuated by the articles in movement onto said article-receiving means when a complete layer of articles has been placed thereon for relatively shifting said articles and said article-supporting means to deposit said layer of articles upon the underlying pallet and for returning said support to article receiving position and means controlled by said support in movement to its return position for partially rotating said support after each layer is deposited thereon.

11. In a pallet-loading machine a support for the pallet to be loaded, means for assembling articles of generally oblong contour in a horizontal plane adjacent two sides of a pallet positioned on said support, with the long dimensions of the articles adjacent one side of the pallet at right angles to the long dimensions of the articles adjacent the other side of the same, and means for shifting articles at both sides of the pallet support onto said pallet to form a layer of articles arranged with the long axes of certain of said articles at right angles to the long axes of the remaining articles in said layer.

12. In a pallet-loading machine a support for the pallet to be loaded, a support for articles overlying said pallet, means for assembling articles of generally oblong contour in layers on said article support with a portion of said articles arranged with their long axes at right angles to the long axes of the remaining articles, means for successively depositing said layers on a pallet on said pallet-support and means for partially relatively rotating said pallet-support and said article support after the deposit of a layer of articles on said pallet.

13. A machine for automatically loading cases onto a pallet comprising accumulator means for accumulating layers of cases and thereafter discharging said layers, supporting means positioned underneath said accumulator means, means for placing an empty pallet on said supporting means after said supporting means is in position for discharge of the first layer of cases from said accumulator means, and means for moving said pallet and supporting means downward after the discharge of each successive layer of cases.

14. A pallet loading machine comprising a pallet hoisting means, means for positioning a pallet on said hoist, an apron disposed above said hoist, means for presenting articles to be stacked on the pallet along one edge of said apron, a second means for presenting articles to be stacked on the pallet along another edge of the apron and at right angles to the first mentioned articles presenting means, pusher means associated with each presenting means for shifting the articles onto said apron to form a tier of articles thereon, means for retracting said apron to deposit said tier of articles on the pallet, means for indexing the pallet while on the hoist and means for successively lowering the hoist after each deposit of a tier on the pallet for positioning the upper surface of each deposited tier to receive a succeeding tier.

References Cited in the file of this patent

UNITED STATES PATENTS

| | | |
|---|---|---|
| 422,094 | Rich | Feb. 25, 1890 |
| 805,099 | Sage | Nov. 21, 1905 |
| 1,365,120 | Myers | Jan. 11, 1921 |
| 1,414,998 | Allen | May 2, 1922 |
| 1,551,890 | Luce | Sept. 1, 1925 |
| 1,639,576 | Semashko | Aug. 16, 1927 |
| 1,654,706 | Schoen | Jan. 3, 1928 |
| 1,928,923 | Andersen | Oct. 3, 1933 |
| 2,065,674 | Fay | Dec. 29, 1936 |
| 2,396,090 | Curtis | Mar. 5, 1946 |
| 2,401,592 | Van Stocker | June 4, 1946 |
| 2,508,861 | Jessen | May 23, 1950 |
| 2,598,222 | Cahners et al. | May 27, 1952 |
| 2,633,251 | Bruce | Mar. 31, 1953 |
| 2,655,271 | Cole et al. | Oct. 13, 1953 |

FOREIGN PATENTS

| | | |
|---|---|---|
| 684,851 | Germany | Dec. 6, 1939 |
| 612,761 | Great Britain | Nov. 17, 1948 |